(12) United States Patent
Hartmann et al.

(10) Patent No.: US 8,091,538 B2
(45) Date of Patent: Jan. 10, 2012

(54) METHOD AND DEVICE FOR DIAGNOSING AN INTERNAL COMBUSTION ENGINE; COMPUTER PROGRAM AND COMPUTER PROGRAM PRODUCT

(75) Inventors: Dirk Hartmann, Stuttgart (DE); Winfried Langer, Illingen (DE); Armin Huber, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 12/462,972

(22) Filed: Aug. 11, 2009

(65) Prior Publication Data

US 2010/0043746 A1 Feb. 25, 2010

(30) Foreign Application Priority Data

Aug. 21, 2008 (DE) .................. 10 2008 041 406

(51) Int. Cl.
*F02D 41/22* (2006.01)
*G01M 15/11* (2006.01)

(52) U.S. Cl. ... 123/690; 123/431; 123/470; 123/406.27; 123/575; 123/525; 73/114.02; 73/114.62; 73/114.45

(58) Field of Classification Search .................. 123/431, 123/406.27, 470, 575–577, 525–527, 690; 73/114.02–114.11, 114.45, 114.62
See application file for complete search history.

(56) References Cited

U.S. PATENT DOCUMENTS

| | | | | | |
|---|---|---|---|---|---|
| 5,567,873 | A | * | 10/1996 | Toyoda | 73/114.02 |
| 5,696,676 | A | * | 12/1997 | Takaba | 701/31 |
| 5,719,330 | A | * | 2/1998 | Carr et al. | 73/114.62 |
| 6,371,092 | B1 | * | 4/2002 | Guglielmo et al. | 123/527 |
| 6,834,640 | B2 | * | 12/2004 | Nishizawa et al. | 123/406.13 |
| 7,273,039 | B2 | * | 9/2007 | Ohno et al. | 123/479 |
| 7,624,721 | B2 | * | 12/2009 | Perryman et al. | 123/479 |
| 2005/0098154 | A1 | * | 5/2005 | Ohtani | 123/431 |

FOREIGN PATENT DOCUMENTS

DE  40 12 109  10/1991
DE  199 22 519  11/2000

* cited by examiner

*Primary Examiner* — Erick Solis
(74) *Attorney, Agent, or Firm* — Kenyon & Kenyon LLP

(57) ABSTRACT

In a method for diagnosing an internal combustion engine having first and second fuel injectors, if a misfire is detected, the following steps are performed in sequence: a first fuel quantity of the fuel is introduced only by the first fuel injector; a check is performed to determine whether a misfire results from the introduction of a first fuel quantity in the first step; a second fuel quantity of the fuel is introduced only by the second fuel injector; a check is performed to determine whether a misfire results from the introduction of the second fuel quantity in the third step; and an engine error is diagnosed if a misfire was detected in the second or in the fourth step.

13 Claims, 5 Drawing Sheets

METHOD AND DEVICE FOR DIAGNOSING AN INTERNAL COMBUSTION ENGINE; COMPUTER PROGRAM AND COMPUTER PROGRAM PRODUCT

BACKGROUND OF THE INVENTION

1. Field of the Invention

The present invention relates to a method and a device for diagnosing an internal combustion engine.

2. Description of Related Art

Published German patent document DE 199 22 519 A1 describes a method for operating a fuel supply system, in which ignition errors or injection errors are detected from abnormalities in the combustion. In published German patent document DE 199 22 519 A1, and as also described in published German patent document DE 40 12 109, a logic circuit connected in parallel to the output stages of the fuel injectors is used to distinguish between ignition errors and injection errors. Additionally, the exhaust gas temperature or the signal of a lambda probe is evaluated.

BRIEF SUMMARY OF THE INVENTION

By contrast, the present invention provides the advantage that a fuel is introduced by a first fuel injector and/or by a second fuel injector for combustion in a combustion chamber such that, if a misfire is detected, the following steps are performed:
  in a first step, a first fuel quantity of the fuel is introduced only by the first fuel injector,
  in a second step, a check is performed to determine whether a misfire results from the first fuel quantity introduced in the first step,
  in a third step, a second fuel quantity of the fuel is introduced only by the second fuel injector,
  in a fourth step, a check is performed to determine whether a misfire results from the second fuel quantity introduced in the third step,
  in a fifth step, an error of the internal combustion engine is diagnosed if a misfire was detected in the second and/or in the fourth step.

This ascertains which of the aforementioned components of the internal combustion engine is defective, while the internal combustion engine is in operation.

It is particularly advantageous if the type of error of the internal combustion engine is ascertained as a function of whether a misfire was detected in the second or in the fourth step or whether a misfire was detected in the second and in the fourth step. The defective component of the internal combustion engine is thus ascertained in a particularly simple manner.

It is particularly advantageous if the combustion is triggered by an ignition device,
  an error of the first fuel injector being detected if a misfire is detected in the second step and no misfire is detected in the fourth step,
  an error of the second fuel injector being detected if no misfire is detected in the second step and a misfire is detected in the fourth step, This makes it possible to attribute an error of the internal combustion engine causally to one of the fuel injectors as a defective component prior to repairing the internal combustion engine.

It is particularly advantageous if the combustion is triggered by an ignition device, and
  an error of the ignition device is detected if a misfire is detected in the second step and a misfire is detected in the fourth step.

This makes it possible to attribute an error of the internal combustion engine causally to the ignition device as a defective component prior to repairing the internal combustion engine.

It is particularly advantageous if the misfire is detected with the aid of a rotational speed sensor signal, an exhaust gas temperature and/or an oxygen concentration in the exhaust gas. The misfire is thus detected in a particularly simple and reliable manner by already existing sensors.

It is particularly advantageous if the first fuel injector introduces fuel into an induction manifold, and if the second fuel injector introduces fuel directly into the combustion chamber. This represents the diagnosis of an internal combustion engine having a manifold injection and a direct injection.

It is particularly advantageous if the same fuel, in particular gasoline, is injected by the first fuel injector and the second fuel injector. This makes the diagnosis available for an internal combustion engine having only one fuel.

It is particularly advantageous if the first fuel injector injects a liquid fuel, in particular gasoline, and the second fuel injector injects a gaseous fuel, in particular compressed natural gas. The method for the diagnosis may also be applied in an internal combustion engine having a liquid fuel and a gaseous fuel.

It is particularly advantageous if the diagnosis of the internal combustion engine is carried out only after a misfire has been detected. The diagnosis of the internal combustion engine is thereby performed in a particularly efficient manner, and the operation of the internal combustion engine is interrupted by the diagnosis only if it has been determined that there is possibly an error.

It is particularly advantageous if a check is performed to determine whether the fuel quantity in at least one of the fuel tanks supplying the first and/or the second fuel injector is greater than a specified threshold value, and if the diagnosis is performed only in that case. This prevents a false response of the diagnosis in a particular simple and effective manner.

It is particularly advantageous if
  the internal combustion engine is switched off as soon as an error of the ignition device is detected, or
  the fuel is introduced only by the first fuel injector as soon as an error of the second fuel injector is detected, or
  the fuel is introduced only by the second fuel injector as soon as an error of the first fuel injector is detected.

This increases the availability of the internal combustion engine and at the same time ensures the operational reliability.

DETAILED DESCRIPTION OF THE INVENTION

Figure 1:
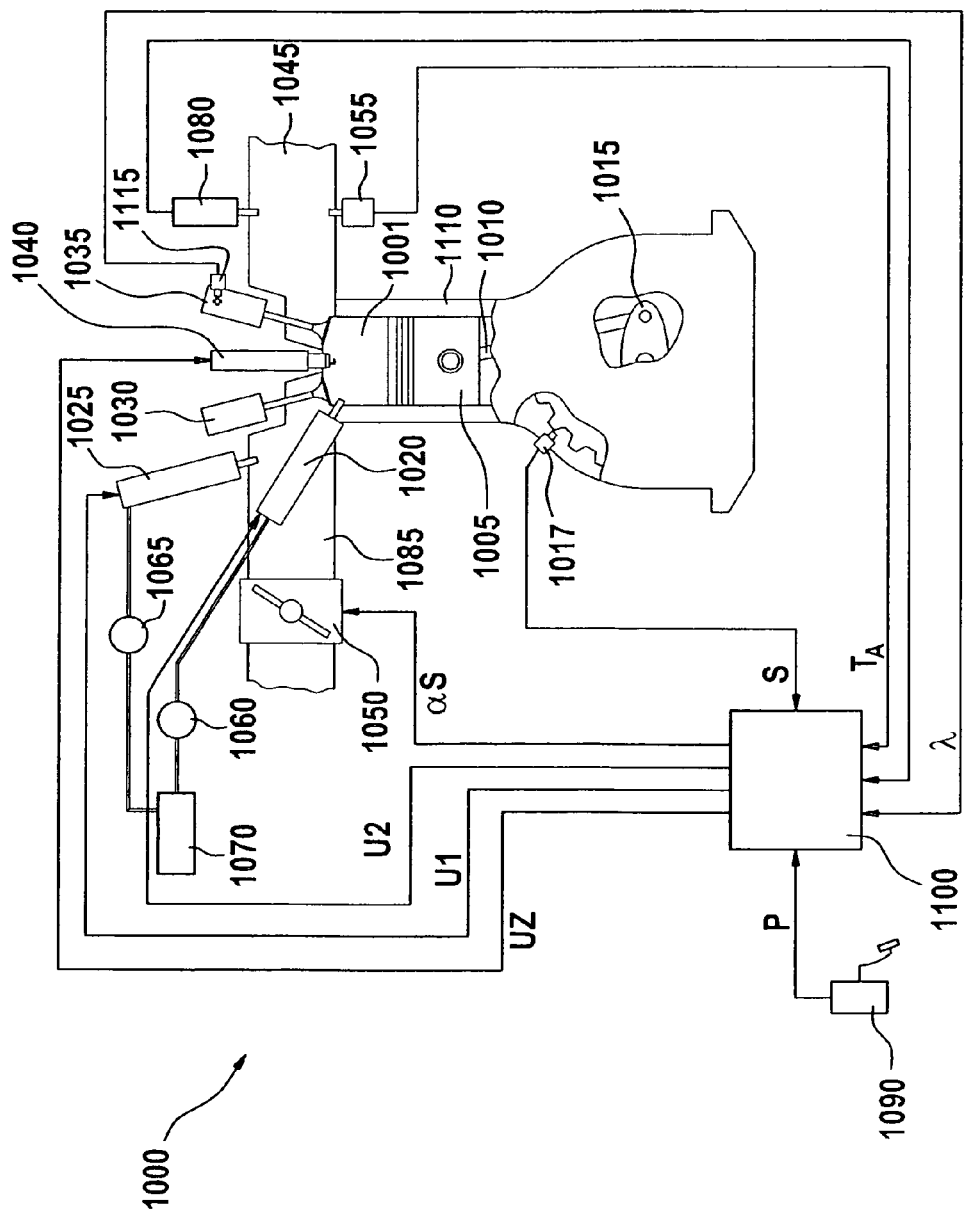
FIG. 1 shows a schematic representation of an internal combustion engine for illustrating a first example embodiment.

FIG. 1 shows a schematic representation of an internal combustion engine indicated by reference numeral 1000. Internal combustion engine 1000 comprises a combustion chamber 1001, which is supplied with fresh air via a throttle valve 1050 through an induction manifold 1085. Additionally, a first fuel Q1, for example gasoline, is transported from a first fuel tank 1070 by way of a fuel pump 1065 to a first fuel injector 1025, from which the first fuel Q1 is introduced into induction manifold 1085. In a working cycle of a cylinder 1110, which in a four-stroke Otto engine for example comprises the strokes of aspiration, compression, working or combustion, and exhausting, the introduced first fuel Q1 is aspirated together with the fresh air into combustion chamber 1001 in the aspiration stroke. Additionally, a second fuel Q2, for example gasoline, is pumped from the first fuel tank 1070 by way of a high-pressure pump 1060 to a second fuel valve 1020 and is introduced for example at the end of the compression stroke or at the beginning of the working stroke into combustion chamber 1001. An intake valve 1030 is situated between induction manifold 1085 and combustion chamber 1001. In addition, an exhaust valve is situated between combustion chamber 1001 and an exhaust pipe 1045. Intake valve 1030 and exhaust valve 1035 are controlled in a known manner for example by a camshaft (not shown in FIG. 1) for example in such a way that intake valve 1030 is for example open in the aspiration stroke of the working cycle and closed during the working stroke. Exhaust valve 1035 is controlled for example in such a way that it is also closed during the working stroke and is open during the exhaust stroke. As an alternative to the camshaft, intake valve 1030 and exhaust valve 1035 may also be controlled by other adjusting mechanisms, for example a variable valve drive.

A spark plug 1040 situated in internal combustion engine 1000 ignites a fuel-air mixture, produced by introducing first fuel Q1 and second fuel Q2, in combustion chamber 1001 at the beginning of the working stroke for example. The thermal energy produced by the combustion of the fuel-air mixture is converted at least partially into a mechanical energy by which a piston 1005 situated in cylinder 1010 moves. A crankshaft 1015 is set into a rotary motion via a connecting rod 1010, which connects piston 1005 with crankshaft 1015. The rotary motion of crankshaft 1015 is detected by an inductive speed sensor having an incremental gear 1017 and is transmitted to a control unit 1100, for example in the form of impulses S. An exhaust gas formed by the combustion is exhausted from the combustion chamber through exhaust pipe 1045 in the exhaustion stroke. In the process, the exhaust gas is conducted past an exhaust gas temperature sensor 1055 situated in exhaust pipe 1045 and past a lambda sensor 1080 likewise situated in the exhaust pipe. Exhaust gas temperature sensor 1055 ascertains the temperature of the exhaust gas and transmits it for example as exhaust gas temperature $T_A$ to control unit 1100. Lambda sensor 1080 ascertains an oxygen concentration in the exhaust gas and transmits the oxygen concentration in the exhaust gas λ to control unit 1100.

In addition, a phase sensor 1115 is situated in the internal combustion engine, which detects the angular position of the camshaft and transmits it to control unit 1100.

In addition, control unit 1100 receives an accelerator pedal position P for example from an accelerator pedal position sensor 1090, which ascertains the position of an accelerator pedal when internal combustion engine 1000 is used in a motor vehicle.

Control unit 1100 controls spark plug 1040 for example using a voltage signal UZ. Voltage signal UZ triggers the ignition in a known manner.

In addition, control unit 1100 controls first fuel injector 1025 by a voltage signal U1 and second fuel injector 1020 by a voltage signal U2. Throttle valve 1050 is controlled for example by a setpoint value signal αS, which specifies a setpoint opening angle of throttle valve 1050.

Figure 2:
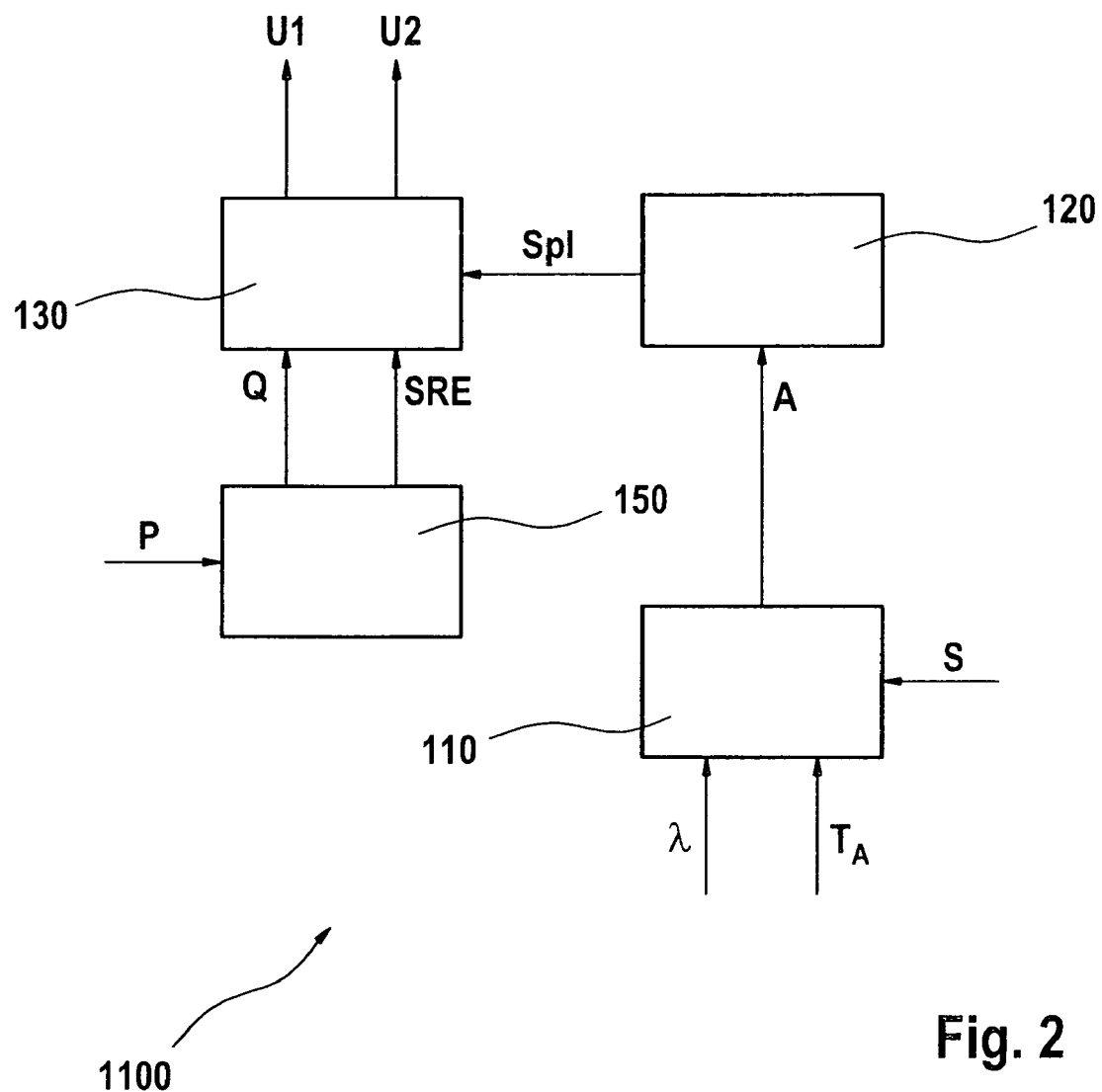
FIG. 2 shows a schematic representation of the structure of an example embodiment of a control unit.

Control unit 1100 is shown in FIG. 2 and comprises a misfire detection unit 110, which ascertains a misfire on the basis of impulses S from inductive speed sensor 1017, exhaust gas temperature $T_A$ from exhaust gas temperature sensor 1055 and/or oxygen concentration in the exhaust gas λ from lambda sensor 1080. A method for detecting the misfire is indicated, for example, in published German patent document DE 199 22 519 A1 and is not described here in more detail. Misfire detection unit 110 ascertains a misfire signal A and transmits it to a calculation unit 120, which is provided in control unit 1100. Misfire signal A takes on the value TRUE if misfire detection unit 110 has detected a misfire. Otherwise, misfire signal A has the value FALSE.

Misfire detection unit 110 additionally ascertains a rotational speed n of internal combustion engine 1000. Rotational speed n of internal combustion engine 1000 is ascertained in a known manner from the impulses S transmitted by the inductive speed sensor.

Calculation unit 120 ascertains a first splitting factor Spl and transmits it to a triggering unit 130. Splitting factor Spl assumes either the value 0% or 100%. The first splitting factor Spl is calculated as a function of misfire signal A. In addition, calculation unit 120 ascertains a diagnosis of internal combustion engine 1000 as a function of whether a misfire is detected in the combustion of first fuel quantity Q1 and/or in the combustion of second fuel quantity Q2. Calculation unit 120 diagnoses an error of internal combustion engine 1000 as a function of whether a misfire was detected.

A specifying unit 150 situated in control unit 1100 ascertains a setpoint fuel quantity Q as a function of for example a driver input that is transmitted by accelerator pedal position signal P from accelerator pedal position sensor 1090 to specifying unit 150. For this purpose, the setpoint fuel quantity Q required for implementing the driver input is ascertained for example from a first characteristics map in a known manner. For example, with the aid of the first characteristics map, each value of acceleration pedal position signal P for each rotational speed n of internal combustion engine 1000 is assigned a certain setpoint fuel quantity Q.

The first characteristics map is ascertained for example in an application step and stored in a memory, for example in control device 1100. In addition, specifying unit 150 ascertains a second splitting factor SRE, which may assume values from 0 to 100% and which indicates what percentage of setpoint fuel quantity Q is to be converted by injecting the second fuel with the aid of fuel injector 1025. Second splitting factor SRE is ascertained for example as a function of the operating point of the internal combustion engine, in particular as a function of the rotational speed n of the internal combustion engine and the accelerator position P. For example, second splitting factor SRE is determined with the aid of a second characteristics map, which assigns to each rotational speed n of the internal combustion engine and to each accelerator pedal position P a value of second splitting factor SRE between 0% and 100%. For example, for an increasing rotational speed n and an increasing accelerator pedal position P, second splitting factor SRE is selected to be of an increasing magnitude.

From setpoint fuel quantity Q and second splitting factor SRE, triggering unit 130 first ascertains a first fuel quantity Q1 to be injected and a second fuel quantity Q2 to be injected. For example, first fuel quantity Q1 to be injected and second fuel quantity Q2 to be injected are calculated as follows:

$$Q1=Q*(1-SRE)$$

$$Q2=Q*SRE$$

From first fuel quantity Q1 to be injected, first electrical control signal U1 is ascertained for example with the aid of a first valve characteristic curve, which represents a correlation between first fuel quantity Q1 to be injected and a first opening duration T1 of first fuel injector 1025. First valve characteristic curve is specified by the manufacturer of first fuel injector 1025 and stored in the memory of control unit 1100. Second electrical control signal U2 is determined for example with the aid of a second valve characteristic curve, which assigns to the second fuel quantity Q2 to be injected a second opening duration T2 of second fuel injector 1020. Second valve characteristic curve is specified by the manufacturer of second fuel injector 1020 and likewise stored in the memory of control unit 1100.

For calculating first electrical control signal U1 and second electrical control signal U2, triggering unit 130 switches between second splitting factor SRE and first splitting factor Spl. Triggering unit 130 selects the switching times in accordance with the method of the present invention. For example, first fuel quantity Q1 to be injected and second fuel quantity Q2 to be injected are calculated as a function of first splitting factor Spl as follows:

$$Q1=Q*(1-Spl)$$

$$Q2=Q*Spl$$

Figure 3:
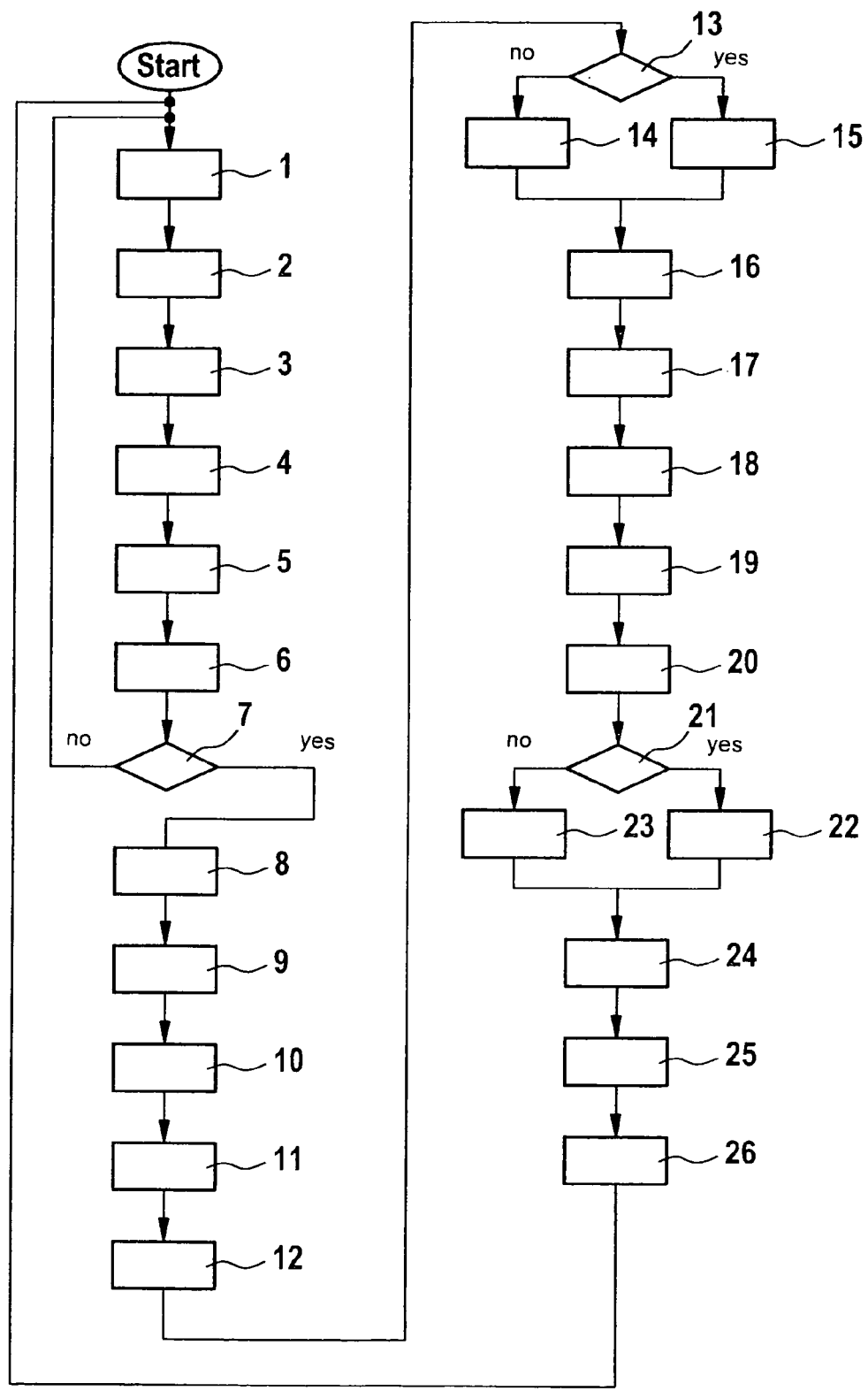
FIG. 3 shows a flow chart of the method according to the present invention.

A flow chart of the method according to the present invention is provided in FIG. 3 and described in the following.

The method of the present inventions is started as soon as the internal combustion engine is taken into operation. The method of the present invention is implemented as a computer program for example and executed in control unit 1100.

Following the start, the setpoint fuel quantity Q is specified in a step 1 in a known manner, for example as a function of accelerator pedal position P. Subsequently, a step 2 is executed.

In step 2, the second splitting factor SRE is determined. Second splitting factor SRE is determined for example with the aid of the second characteristics map, which assigns to each rotational speed n of the internal combustion engine and to each accelerator pedal position P a value of second splitting factor SRE between 0% and 100%. Subsequently, a step 3 is executed.

In step 3, first fuel quantity Q1 to be injected and second fuel quantity Q2 to be injected are ascertained as a function of for example setpoint fuel quantity Q and second splitting factor SRE for example as follows:

$$Q1=Q*(1-SRE)$$

$$Q2=Q*SRE.$$

Subsequently, a step 4 is executed.

First opening duration T1 of first fuel injector 1025 is ascertained in step 4 with the aid of the first valve characteristic curve from first fuel quantity Q1 to be injected. In addition, second opening duration T2 of second fuel injector 1020 is ascertained with the aid of the second valve characteristic curve from second fuel quantity Q2 to be injected. Subsequently, a step 5 is executed.

In step 5, first fuel injector 1025 and second fuel injector 1020 are controlled in accordance with first opening duration T1 and second opening duration T2. To this end, first fuel injector 1025 and second fuel injector 1020 are controlled for example by first electrical control signal U1 and second electrical control signal U2. First electrical control signal U1 and second electrical control signal U2 are voltage signals of 15V for example. Subsequently, a step 6 is executed.

The misfire detection is started in step 6. For this purpose, segment times S, exhaust gas temperature TA and/or oxygen concentration in the exhaust gas λ are evaluated in a known manner. If a misfire was detected, misfire signal A is set to the value TRUE. Otherwise, misfire signal A is set to the value FALSE. Subsequently, a step 7 is executed.

In step 7, a check is performed to determine whether the misfire signal has the value TRUE or the value FALSE. If misfire signal A has the value TRUE, the system branches to a step 8. Otherwise, the system branches to step 1.

As an alternative to steps 6 and 7, the branching to step 8 or step 1 may also occur as a function of other operating parameters of internal combustion engine 1000. For example, while internal combustion engine 1000 is in operation, the system may branch to step 8 as a function of a specified time interval or a specified number of revolutions of internal combustion engine 1000.

In step 8, first splitting factor Spl is set to the value of 100%. Subsequently, a step 9 is executed.

In step 9, first fuel quantity Q1 to be injected and second fuel quantity Q2 to be injected are ascertained as a function of first splitting factor Spl. For example, first fuel quantity Q1 to be injected and second fuel quantity Q2 to be injected are ascertained as follows:

$$Q1=Q*(1-Spl)$$

$$Q2=Q*Spl$$

Subsequently, a step 10 is executed.

First opening duration T1 of first fuel injector 1025 is ascertained in step 10 with the aid of the first valve characteristic curve from first fuel quantity Q1 to be injected. In addition, second opening duration T2 of second fuel injector 1020 is ascertained with the aid of the second valve characteristic curve from second fuel quantity Q2 to be injected. Subsequently, a step 11 is executed.

In step 11, first fuel injector 1025 and second fuel injector 1020 are controlled in accordance with first opening duration T1 and second opening duration T2. To this end, first fuel injector 1025 and second fuel injector 1020 are controlled for example by first electrical control signal U1 and second electrical control signal U2. First electrical control signal U1 and second electrical control signal U2 are voltage signals of 15V for example. Subsequently, a step 12 is executed.

In step 12, misfire signal A is ascertained. Misfire signal A is set to the value TRUE if a misfire was detected. Otherwise, misfire signal A is set to the value FALSE. Subsequently, a step 13 is executed.

In step 13, a check is performed to determine whether misfire signal A has the value TRUE or the value FALSE. If misfire signal A has the value TRUE, the system branches to a step 15. Otherwise, the system branches to a step 14.

In step 14, first error signal SRE_A is set to the value 0. Subsequently, a step 16 is executed.

In step 15, a first error variable SRE_A is set to the value 1. Subsequently, step 16 is executed.

In step 16, first splitting factor Spl is set to the value of 0%. Subsequently, a step 17 is executed.

In step 17, first fuel quantity Q1 to be injected and second fuel quantity Q2 to be injected are ascertained as a function of first splitting factor Spl for example as follows:

$$Q1 = Q*(1-Spl)$$

$$Q2 = Q*Spl$$

Subsequently, a step 18 is executed.

First opening duration T1 of first fuel injector 1025 is ascertained in step 18 with the aid of the first valve characteristic curve from first fuel quantity Q1 to be injected. In addition, second opening duration T2 of second fuel injector 1020 is ascertained with the aid of the second valve characteristic curve from second fuel quantity Q2 to be injected. Subsequently, a step 19 is executed.

In step 19, first fuel injector 1025 and second fuel injector 1020 are controlled in accordance with first opening duration T1 and second opening duration T2. To this end, first fuel injector 1025 and second fuel injector 1020 are controlled for example by first electrical control signal U1 and second electrical control signal U2. First electrical control signal U1 and second electrical control signal U2 are voltage signals of 15V for example. Subsequently, a step 20 is executed.

In step 20, misfire signal A is ascertained. Misfire signal A is set to the value TRUE if a misfire is detected. Otherwise, misfire signal A is set to the value FALSE. Subsequently, a step 21 is executed.

In step 21, a check is performed to determine whether misfire signal A has the value TRUE or the value FALSE. If the misfire signal has the value TRUE, the system branches to a step 22, otherwise to a step 23.

In step 22, a second error signal BDE_A is set to the value 1. Subsequently, a step 24 is executed.

In step 23, second error signal BDE_A is set to the value 0. Subsequently, step 24 is executed.

In step 24, a diagnostic signal F is ascertained as a function of the values of first error signal SRE_A and second error signal BDE_A. Diagnostic signal F may assume for example the values "no defect", "first injector 1020 defective", "second injector 1025 defective" or the value "ignition defective". Diagnostic signal F takes on the value "first injector 1020 defective" if first error signal SRE_A=1. Diagnostic signal F takes on the value "second injector 1025 defective" if second error signal BDE_A=1. Diagnostic signal F takes on the value "ignition defective" if first error signal SRE_A=1 and second error signal BDE_A=1. Otherwise, diagnostic signal F assumes the value "no defect". Subsequently, a step 25 is executed.

In step 25, first error signal SRE_A and second error signal BDE_A are set to zero. Subsequently, a step 26 is executed.

In step 26, the value of diagnostic signal F is stored in a memory in control unit 1100 and is output via an interface, for example a CAN interface, to a display unit for activating a warning light MIL. The system subsequently branches to step 1.

The method of the present invention is terminated in a known manner at any time at which for example internal combustion engine 1000 is shut down.

The method of the present invention is not limited to an internal combustion engine 1000 having one cylinder 1110. If internal combustion engine 1000 comprises multiple cylinders 1110, the method of the present invention is analogously applied to each cylinder 1110. In this case, diagnostic signal F is extended in such a way for example that it additionally contains information about which of the cylinders 1110 of internal combustion engine 1000 is defective.

Figure 4:
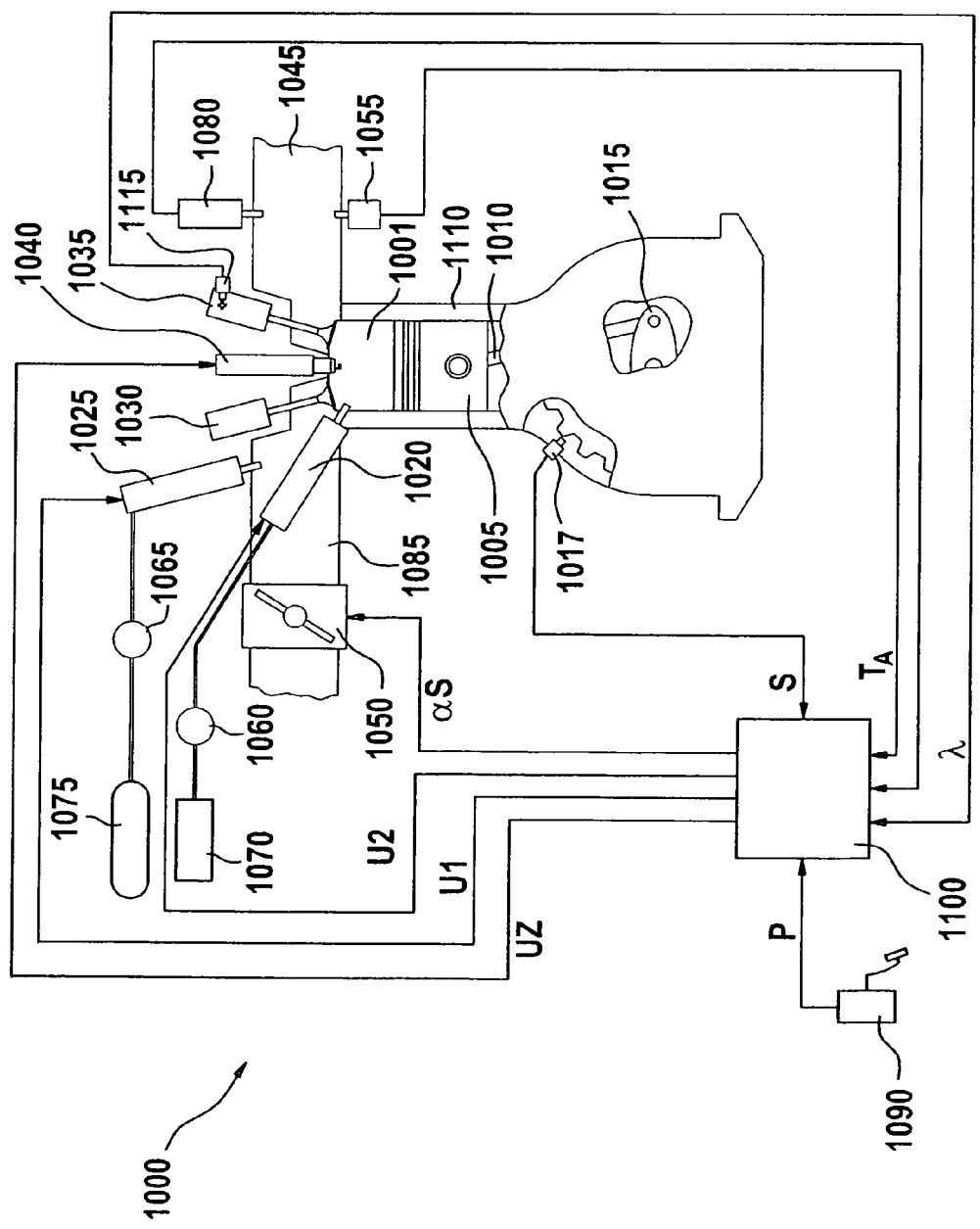
FIG. 4 shows a schematic representation of an internal combustion engine for illustrating a second example embodiment.

In a second example embodiment, the method is applied for example in a modified way to an internal combustion engine having two different types of fuel, for example gasoline and compressed natural gas. A device according to the second example embodiment is depicted in FIG. 4. In this case, elements of the device according to the second example embodiment, which correspond to the elements of the device according to the first example embodiment, have the same reference numeral.

In addition to the device according to the first example embodiment, the device according to the second example embodiment includes a second fuel tank 1075, which contains a second fuel, for example compressed natural gas. This second fuel is injected into the induction manifold by an additional pressure regulating module 1065 and a first fuel injector 1025 in the form of an injection valve.

Figure 5:
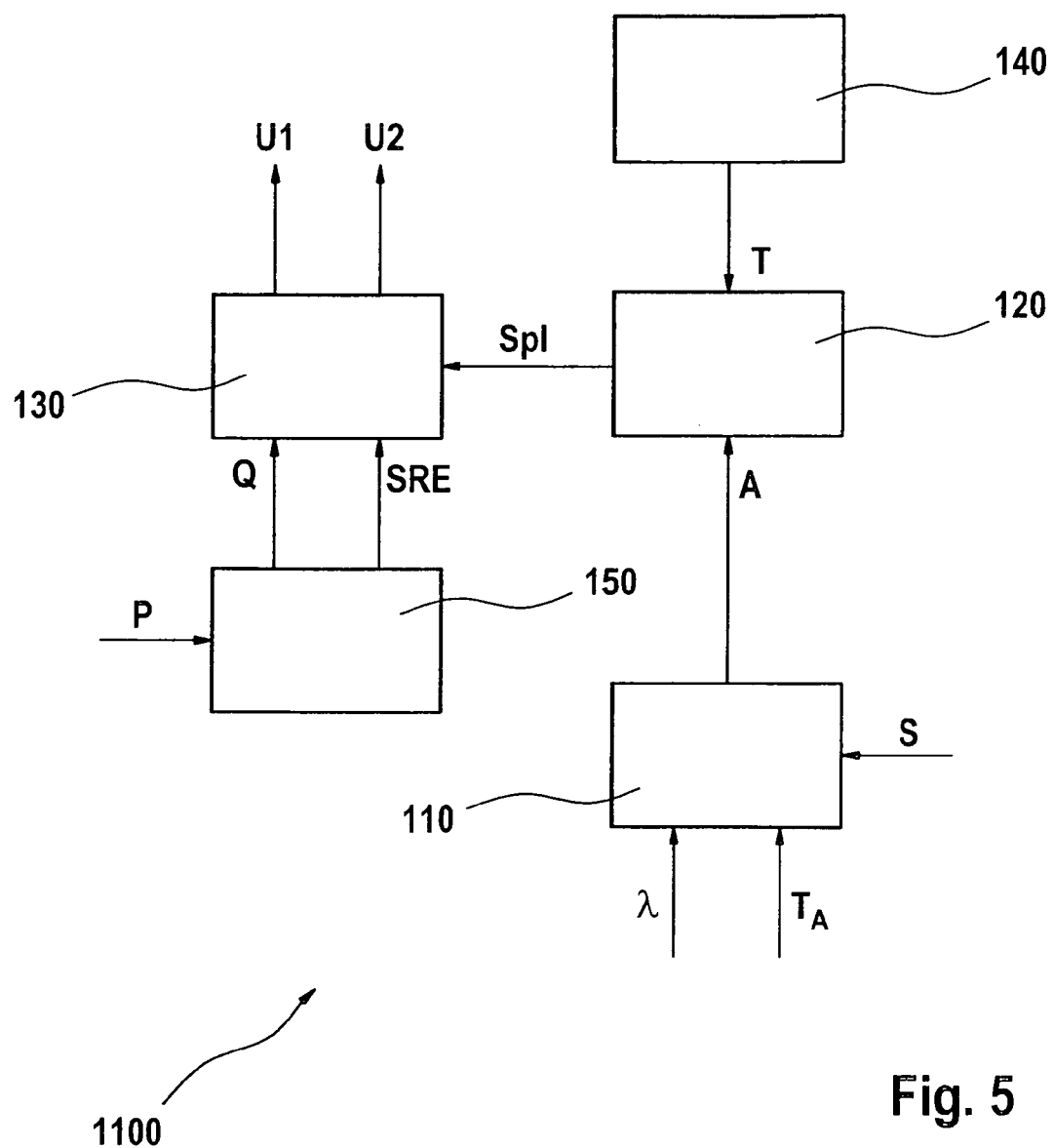
FIG. 5 shows a schematic representation of the structure of another example embodiment of a control unit.

In addition, according to the second example embodiment as shown in FIG. 5, control unit 1100 comprises an additional detection unit 140, which detects a first level of a third fuel quantity in the first fuel tank 1070 and a second level of a fourth fuel quantity in the second fuel tank 1075 and ascertains a tank level signal T. The level of the third fuel quantity in first fuel tank 1070 is ascertained for example by a level sensor situated in first fuel tank 1070. The level of the fourth fuel quantity in the second fuel tank is ascertained for example also with the aid of a level sensor installed in the second fuel tank. Tank level signal T takes on the value FULL if the level of the third fuel quantity in first fuel tank 1070, which is transmitted by the level sensor in first fuel tank 1070, is higher than a first threshold value of zero for example, and the level of the fourth fuel quantity, which is transmitted by the level sensor in second fuel tank 1075, is greater than a second threshold value, for example zero. Otherwise, tank level signal T is set to the value EMPTY.

All of the steps of the first example embodiment are carried out analogously in the second example embodiment.

In contrast to the first example embodiment, in the second example embodiment the level of first fuel tank 1070 and of second fuel tank 1075 is ascertained in a first additional step following step 7, and tank level signal T is determined. Subsequently, a second additional step is performed.

In the second additional step, a check is carried out to determine whether tank level signal T has the value EMPTY. If the response is "yes", the system branches to step 1. Otherwise, the system branches to step 8.

Starting from the first example embodiment, in a third example embodiment, the additional steps, described in the second example embodiment, for ascertaining and checking tank level signal T for an internal combustion engine having first fuel tank 1070 are applied analogously. For this purpose, only the level of first fuel tank 1070 is detected and checked. The remaining steps of the third example embodiment correspond to the steps of the first example embodiment.

The method of the present invention may be additionally applied in a fourth example embodiment even in internal combustion engines without ignition devices. For this purpose, diagnostic signal F in step 24 takes on for example the values "no defect", "first fuel injector defective", "second fuel injector defective" and "first fuel injector and second fuel injector defective". Diagnostic signal F takes on the value "first fuel injector defective" if first error signal SRE_A=1. Diagnostic signal F takes on the value "second fuel injector defective" if second error signal BDE_A=1. Diagnostic signal F takes on the value "first fuel injector and second fuel injector defective" if first error signal SRE_A=1 and second error signal BDE_A=1. Otherwise, diagnostic signal F assumes the value "no defect". The remaining steps of the fourth example embodiment then correspond to the steps of one of the preceding example embodiments.

The method according to the present invention is not limited of the use of compressed natural gas and/or gasoline as fuel. The method according to the present invention is used in an analogous manner for internal combustion engines 1000 with other fuels, for example diesel or liquid gas.

The method according to the present invention is not limited to the design of internal combustion engine 1000 having a first fuel injector 1025 situated on induction manifold 1085 and a second fuel injector 1020 for direct injection. The method according to the present invention is analogously applied to other designs, for example for two induction manifold fuel injectors or two direct fuel injectors.

What is claimed is:

1. A method for diagnosing an internal combustion engine having a first fuel injector for introducing a first fuel for combustion in a combustion chamber and a second fuel injector for introducing a second fuel for combustion in the combustion chamber, comprising:
    in a first step, introducing a first fuel quantity of the first fuel only by the first fuel injector;
    in a second step, performing a check to determine whether a misfire results from introduction of the first fuel quantity in the first step;
    in a third step, introducing a second fuel quantity of the second fuel only by the second fuel injector;
    in a fourth step, performing a check to determine whether a misfire results from introduction of the second fuel quantity in the third step;
    in a fifth step, determining an error of the internal combustion engine if a misfire was detected in at least one of the second step and the fourth step.

2. The method as recited in claim 1, wherein different types of errors of the internal combustion engine are determined depending on whether (a) a misfire was detected in one of the second step or in the fourth step, or (b) a misfire was detected in both the second step and in the fourth step.

3. The method as recited in claim 2, wherein:
    an error of the first fuel injector is detected if a misfire is detected in the second step and no misfire is detected in the fourth step; and
    an error of the second fuel injector is detected if no misfire is detected in the second step and a misfire is detected in the fourth step.

4. The method as recited in claim 2, wherein a desired combustion is triggered by an ignition device, and wherein an error of the ignition device is detected if a misfire is detected in both the second step and the fourth step.

5. The method as recited in claim 2, wherein the misfire is detected by at least one of a rotational speed sensor signal, an exhaust gas temperature, and an oxygen concentration in the exhaust gas.

6. The method as recited in claim 2, wherein the first fuel injector introduces the first fuel directly into the combustion chamber, and wherein the second fuel injector introduces the second fuel into an induction manifold for the combustion chamber.

7. The method as recited in claim 2, wherein the first fuel and the second fuel are the same.

8. The method as recited in claim 2, wherein a liquid fuel is selected as the first fuel, and a gaseous fuel is selected as the second fuel.

9. The method as recited in claim 2, wherein the method steps for the diagnosis are performed only after a misfire has been detected.

10. The method as recited in claim 2, wherein a first fuel tank supplies the first fuel and a second fuel tank supplies the second fuel, and wherein the method steps for the diagnosis are performed only if a fuel quantity in at least one of the first and second fuel tanks is greater than a specified threshold value.

11. The method as recited in claim 4, wherein one of:
    the internal combustion engine is switched off as soon as an error of the ignition device is detected;
    fuel is introduced only by the first fuel injector as soon as an error of the second fuel injector is detected; or
    fuel is introduced only by the second fuel injector as soon as an error of the first fuel injector is detected.

12. A device for diagnosing an internal combustion engine having a first fuel injector for introducing a first fuel for combustion in a combustion chamber and a second fuel injector for introducing a second fuel for combustion in the combustion chamber, comprising:
    a triggering unit configured to (a) introduce a first fuel quantity of the first fuel only via the first fuel injector and (b) introduce a second fuel quantity of the second fuel only via the second fuel injector;
    a misfire detection unit configured to determine whether a misfire results from the introduction of the first fuel quantity and whether a misfire results from the introduction of the second fuel quantity; and
    a calculation unit configured to diagnose an error of the internal combustion engine as a function of whether one of (a) a misfire was detected from the introduction of the first fuel quantity, (b) a misfire was detected from the introduction of the second fuel quantity, or (c) a misfire was detected from the introduction of each one of the first fuel quantity and the second fuel quantity.

13. A computer-readable storage medium storing a computer program having program codes which, when executed on a computer, control a method for diagnosing an internal combustion engine having a first fuel injector for introducing a first fuel for combustion in a combustion chamber and a second fuel injector for introducing a second fuel for combustion in the combustion chamber, the method comprising:
    in a first step, introducing a first fuel quantity of the first fuel only by the first fuel injector;
    in a second step, performing a check to determine whether a misfire results from introduction of the first fuel quantity in the first step;
    in a third step, introducing a second fuel quantity of the second fuel only by the second fuel injector;
    in a fourth step, performing a check to determine whether a misfire results from introduction of the second fuel quantity in the third step;
    in a fifth step, determining an error of the internal combustion engine if a misfire was detected in at least one of the second step and the fourth step.

* * * * *